United States Patent [19]
Hsiao et al.

[11] Patent Number: 6,074,566
[45] Date of Patent: Jun. 13, 2000

[54] THIN FILM INDUCTIVE WRITE HEAD WITH MINIMAL ORGANIC INSULATION MATERIAL AND METHOD FOR ITS MANUFACTURE

[75] Inventors: Richard Hsiao; Hugo Alberto Emilio Santini, both of San Jose; Clinton David Snyder, Los Gatos, all of Calif.

[73] Assignee: International Business Machines Corporation, Armonk, N.Y.

[21] Appl. No.: 08/933,194

[22] Filed: Sep. 16, 1997

[51] Int. Cl.[7] ........................................................ B44C 1/22
[52] U.S. Cl. .................. 216/2; 29/603; 156/643; 156/646; 156/650; 156/652; 156/656; 156/659.1; 156/665; 156/668; 252/79.1; 252/79.4; 427/532; 427/534; 427/535; 427/548; 360/122; 360/125; 360/126; 216/22; 216/27; 216/34; 216/49
[58] Field of Search .............................. 29/603; 156/643; 156/646, 650, 652, 656, 659.1, 665, 668; 252/79.1, 79.4; 427/532, 534, 535, 548; 360/122, 125, 126; 216/2, 22, 27, 34, 49

[56] References Cited

U.S. PATENT DOCUMENTS

| | | | |
|---|---|---|---|
| 4,791,719 | 12/1988 | Kobayashi et al. | 29/603 |
| 4,881,144 | 11/1989 | Yuito et al. | 360/125 |
| 5,059,278 | 10/1991 | Cohen et al. | 156/643 |
| 5,470,491 | 11/1995 | Kodama et al. | 216/22 |

FOREIGN PATENT DOCUMENTS 6-236514  8/1994  Japan ................................ G11B 5/31

*Primary Examiner*—Samuel A. Acquah
*Attorney, Agent, or Firm*—Altera Law Group, LLC

[57] ABSTRACT

A thin film inductive write head has minimal organic insulation material in contact with the encapsulating overcoat. The process for its fabrication includes a reactive ion etching (RIE) process to remove the organic insulative material while still allowing the head top pole piece to be planar. The organic insulation material is removed by RIE down to the head gap layer in the region between the ABS and the coil. The etching is done with the top or second pole piece acting as a mask so that the planarized organic insulation material is still maintained over the portion of the coil that is located between the two pole pieces. Thus the organic insulation material is still present in this region as the planarization layer onto which the ferromagnetic layer for the second pole piece was deposited. This allows the encapsulating overcoat to be deposited directly on the gap layer, which is formed of the same material as the overcoat, rather than on the organic insulation material, in a substantial portion of the write head structure. In a further embodiment the write head also has the organic insulation material removed down to the gap layer between the coil turns in the portion of the coil that does not lie beneath the second pole piece. The region between the coil turns in this portion of the coil is filled with overcoat material during the head encapsulation process.

18 Claims, 10 Drawing Sheets

THIN FILM INDUCTIVE WRITE HEAD WITH MINIMAL ORGANIC INSULATION MATERIAL AND METHOD FOR ITS MANUFACTURE

TECHNICAL FIELD

This invention relates generally to a thin film inductive write head of the type formed by thin film deposition and lithographic patterning techniques on the trailing end of an air bearing slider used in a magnetic recording disk drive.

BACKGROUND OF THE INVENTION

Thin film inductive write heads used in magnetic recording disk drives have a lithographically patterned thin film coil formed on the trailing end of the head carrier or air-bearing slider. The region between the coil turns and the region between the coil and the air-bearing surface (ABS) of the slider is typically formed of organic photoresist material that has been baked at a high temperature to provide an electrically insulative property. This photoresist material that later becomes the electrical insulation material after high temperature baking is originally deposited between the coil turns and on top of the coil turns to provide a planar surface for the subsequent deposition of a layer of ferromagnetic material that becomes one of the pole pieces. The completed write head, including the outer pole piece, is covered with a dielectric insulator, such as alumina ($Al_2O_3$), to encapsulate the complete head structure. However, the hard baked organic photoresist material beneath the alumina overcoat has a thermal expansion coefficient almost three times that of alumina. As a result, during the recording cycle, when heat is generated by the coil, the overcoat can delaminate and/or protrude past the ABS.

What is needed is an improved thin film inductive write head that minimizes this thermal mismatch of different materials, and a process for its manufacture that still allows for a planarized pole piece to be formed.

SUMMARY OF THE INVENTION

The invention is a thin film inductive write head that has minimal organic insulation material in contact with the encapsulating overcoat, and a process for its fabrication that still allows the head top pole piece to be planar. The organic insulation material is removed by reactive ion etching (RIE) down to the head gap layer in the region between the ABS and the coil. The etching is done with the top or second pole piece acting as a mask so that the planarized organic insulation material is still maintained over the portion of the coil that is located between the two pole pieces. Thus the organic insulation material is still present in this region as the planarization layer onto which the ferromagnetic layer for the second pole piece was deposited. This allows the encapsulating overcoat to be deposited directly on the gap layer, which is formed of the same material as the overcoat, rather than on the organic insulation material, in a substantial portion of the write head structure.

In a further embodiment the write head also has the organic insulation material removed down to the gap layer between the coil turns in the portion of the coil that does not lie beneath the second pole piece. The region between the coil turns in this portion of the coil is filled with overcoat material during the head encapsulation process. The RIE process for this further embodiment uses both the second pole piece and the plated copper of the coil as the mask to remove the organic insulation material between the coil turns and in the region between the coil and the ABS. This etching process will first remove all the organic insulation material on top of the portion of the coil not beneath the second pole piece, but will not remove the organic insulation material under the coils or under the second pole piece. This etching process proceeds until the organic insulation material between the coil turns is also removed. The RIE process uses an $O_2/N_2$ mixture, instead of pure $O_2$, to reduce lateral etching. The oxygen ions and neutrals etch the organic insulation material at a fast rate. Although the active oxygen species in the plasma also oxidizes the metals that are exposed to the plasma, their oxidation rate is much slower than the organic material removal rate, thus a high organic-to-metal selectivity is achieved. The etching process is stopped once the organic insulation material between the coil turns is removed. A high density RIE plasma tool with two power supplies to independently control ion bombardment energy and plasma density is used so that the bombardment energy can be kept low to avoid sputtering the copper and ferromagnetic material of the coil and pole piece, respectively, while the plasma density can be kept relatively high to produce a high throughput.

For a fuller understanding of the nature and advantages of the present invention, reference should be made to the following detailed description taken together with the accompanying figures.

DETAILED DESCRIPTION OF THE INVENTION

Prior Art

Figure 1:
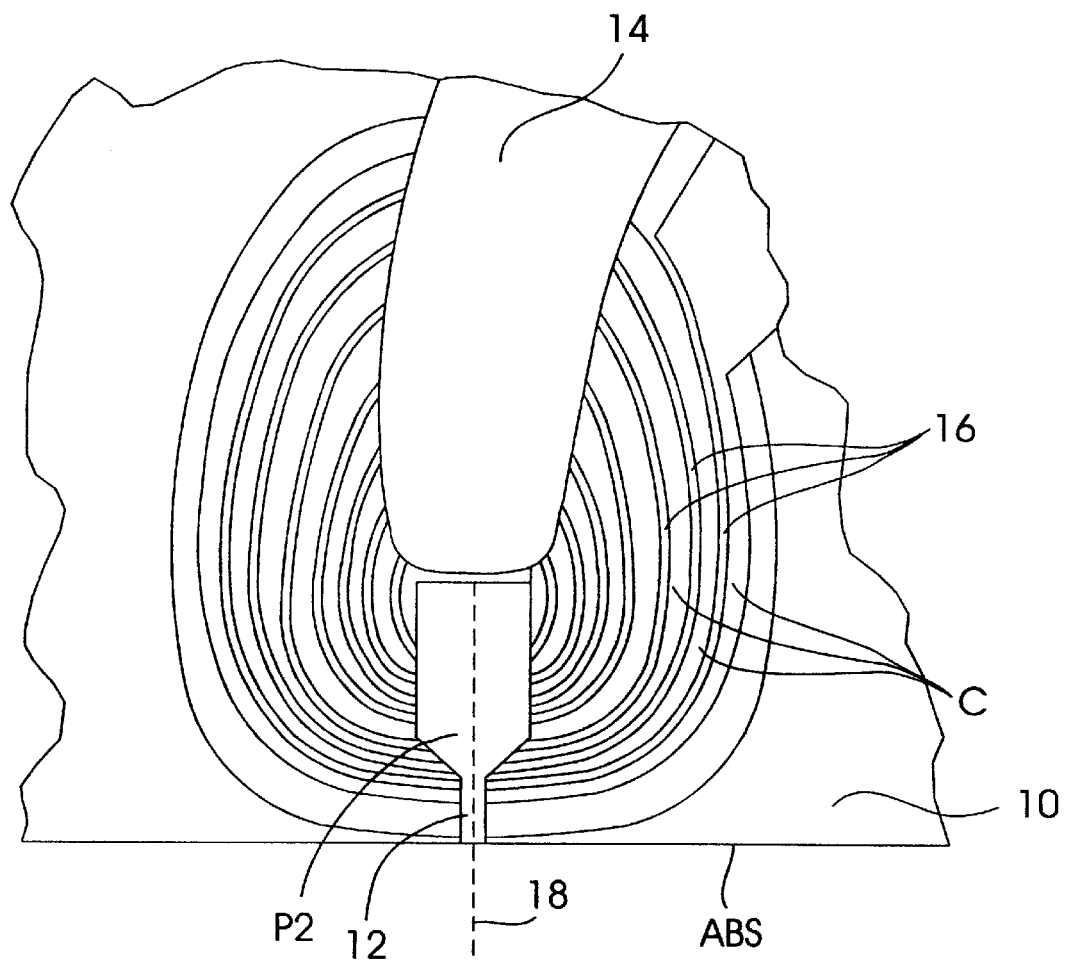
FIG. 1 is an plan view of a prior art integrated read/write head showing the inductive write head on the trailing surface of an air bearing slider.

FIG. 1 is a view of an integrated read/write head taken from the trailing surface of disk drive air bearing slider. FIG. 1 shows the trailing surface 10 and the air bearing surface (ABS) of the slider and portions of the thin film inductive write head patterned on surface 10. The inductive write head includes a coil with multiple coil turns C, a second pole piece P2 with a pole tip 12 located at the ABS, and an electrical lead layer 14 for electrical connection to the coil. The magnetoresistive (MR) read head portion of the integrated read/write head is not shown in FIG. 1 because it lies below the pole piece P2 and coil turns C.

The spaces between the coil turns C and in the region near the ABS surrounding the pole tip is formed of insulation material 16 which is typically the organic photoresist that remains from the coil insulation and planarization process. An overcoat, typically of alumina, is not shown in FIG. 1 but is used to cover and encapsulate the inductive write head. The alumina overcoat is thus formed on top of the organic insulation material that is located between and on top of the coil turns C and also in the region near the ABS surrounding the pole tips. The thermal expansion mismatch between the organic insulation material and the alumina overcoat can result in cracks in the overcoat and can cause overcoat delamination and/or detrimental protrusion into the ABS.

Figure 2:
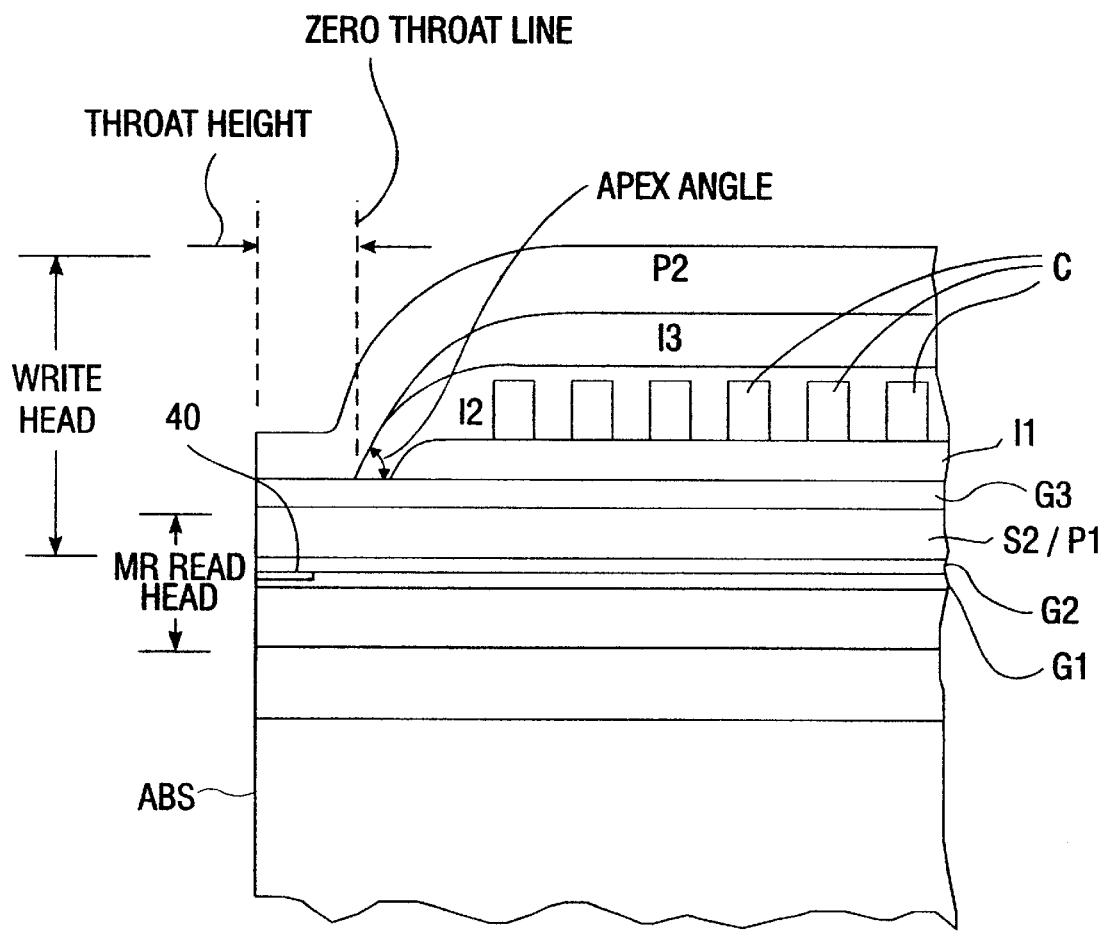
FIG. 2 is a sectional view through line 18 of FIG. 1 showing the layers that make up the inductive write head and underlaying magnetoresistive (MR) read head of a prior art integrated read/write head.

FIG. 2 is a cross-sectional view through dashed line 18 of FIG. 1 and shows both the inductive write head portion and the MR read head portion of the integrated read/write head. The head has been lapped to form the ABS. The read head includes a MR sensor 40 sandwiched between first and second gap layers G1 and G2 which are, in turn, sandwiched between first and second magnetic shield layers S1 and S2. In a conventional disk drive, the MR sensor 40 is an anisotropic magnetoresistive (AMR) sensor. However, the MR sensor 40 could also be a spin-valve magnetoresistive (SVMR) sensor based on the giant magnetoresistance effect. The write head includes an electrically conductive layer that forms coil turns C and insulation layer I2 which are sandwiched between insulation layers I1 and I3 which are, in turn, sandwiched between first and second pole pieces P1 and P2. The first and second pole pieces P1 and P2 are formed of ferromagnetic material, such as NiFe permalloy, and are connected in the region away from the ABS to form a magnetic yoke. A gap layer G3 is sandwiched between the first and second pole pieces P1, P2 at their pole tips adjacent to the ABS for providing a magnetic gap. The angle formed by I2 where it slopes into contact with the gap G3 is called the apex angle and the line of intersection of I2 with G3 is called the zero throat line. The distance from the zero throat line to the end of the pole tip at the ABS is called the throat height. A steep slope or high apex angle is desirable for good head performance because it increases the separation between P1 and P2, which results in less flux leakage from P2 to P1. During writing, signal current is conducted through the coil layer C and flux is induced into the first and second pole layers P1, P2 causing flux to fringe across the pole tips at the ABS. This flux magnetizes circular tracks on the rotating disk during a write operation. During a read operation, magnetized regions on the rotating disk inject flux into the MR sensor 40 of the read head, causing resistance changes in the MR sensor 40. Theses resistance changes are detected by detecting voltage changes across the MR sensor 40. The voltage changes are processed by the disk drive electronics and converted into user data. The integrated head shown in FIG. 2 is a "merged" head in which the second shield layer S2 of the read head is employed as a first pole piece P1 for the write head. In a "piggyback" head (not shown), the second shield layer S2 and the first pole piece P1 are separate layers.

DESCRIPTION OF THE PREFERRED EMBODIMENTS

The process sequence to build the inductive write head according to the present invention with a minimum amount of organic insulation material will be described with respect to FIGS. 3A–3J. Although the process description relates only to an inductive read/write head, it is understood that the process can also be used as part of the fabrication of an integrated read/write head of the type described above with respect to FIGS. 1–2.

Figure 3A:
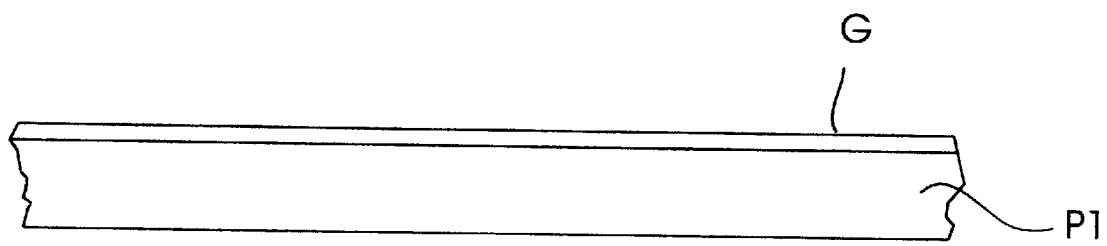
FIGS. 3A–3J are sectional views of the inductive write head of the present invention during steps in its fabrication.
Figure 3B:
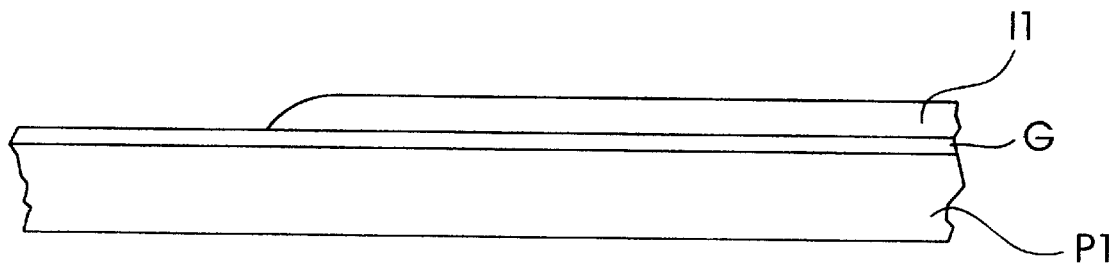
Figure 3C:
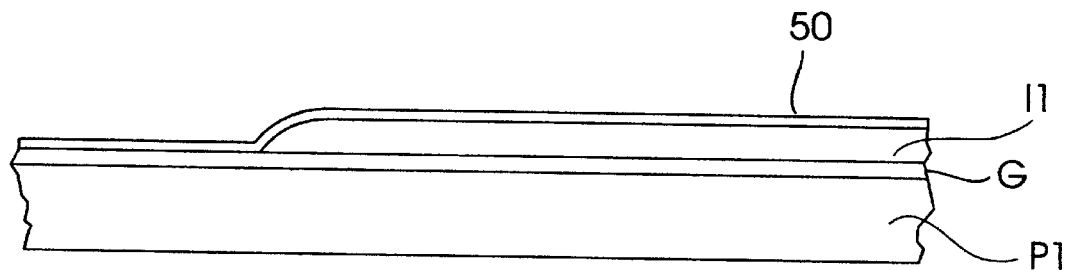
Figure 3D:
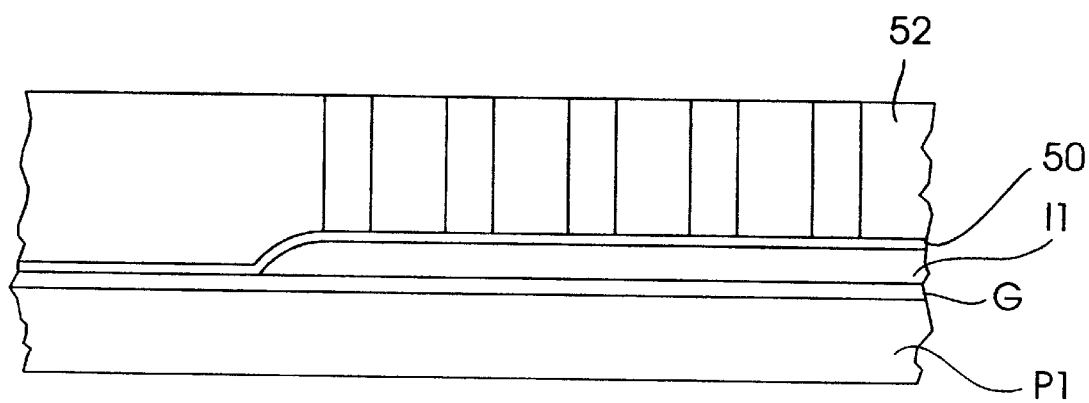
Figure 3E:
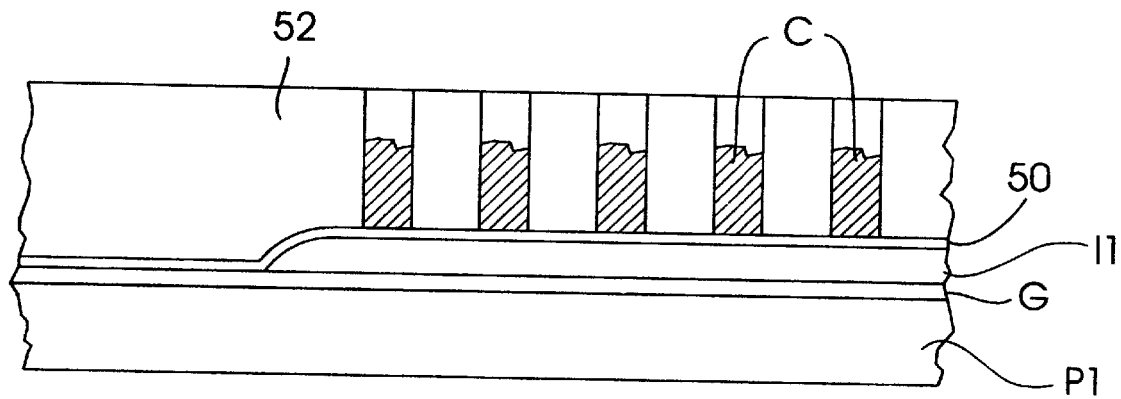
Figure 3F:
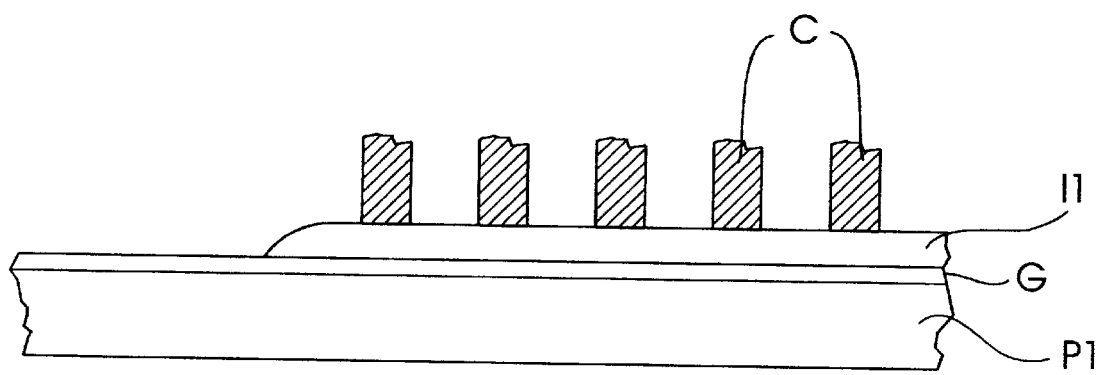
Figure 3G:
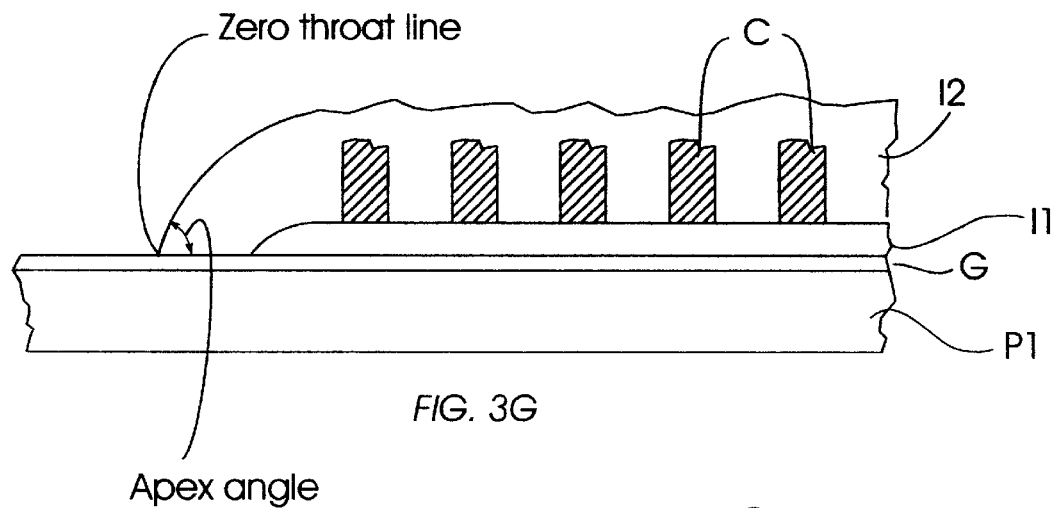
Figure 3H:
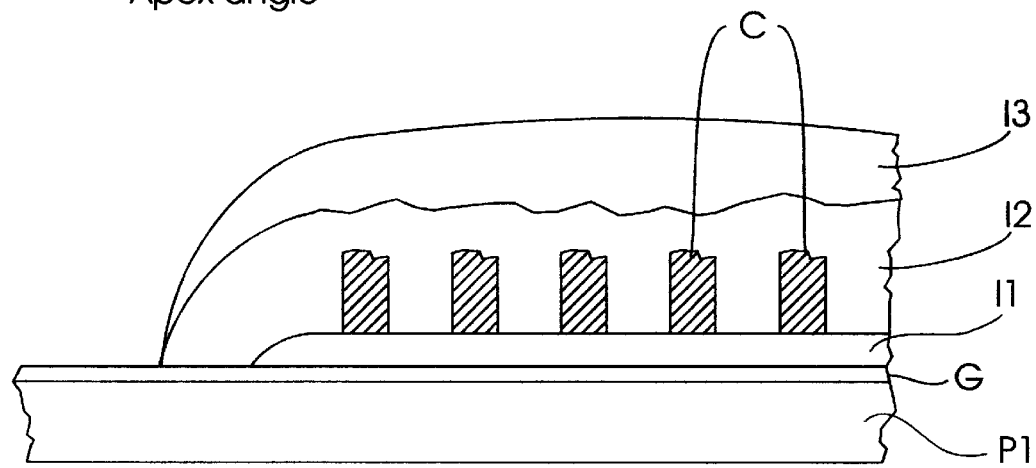
Figure 3I:
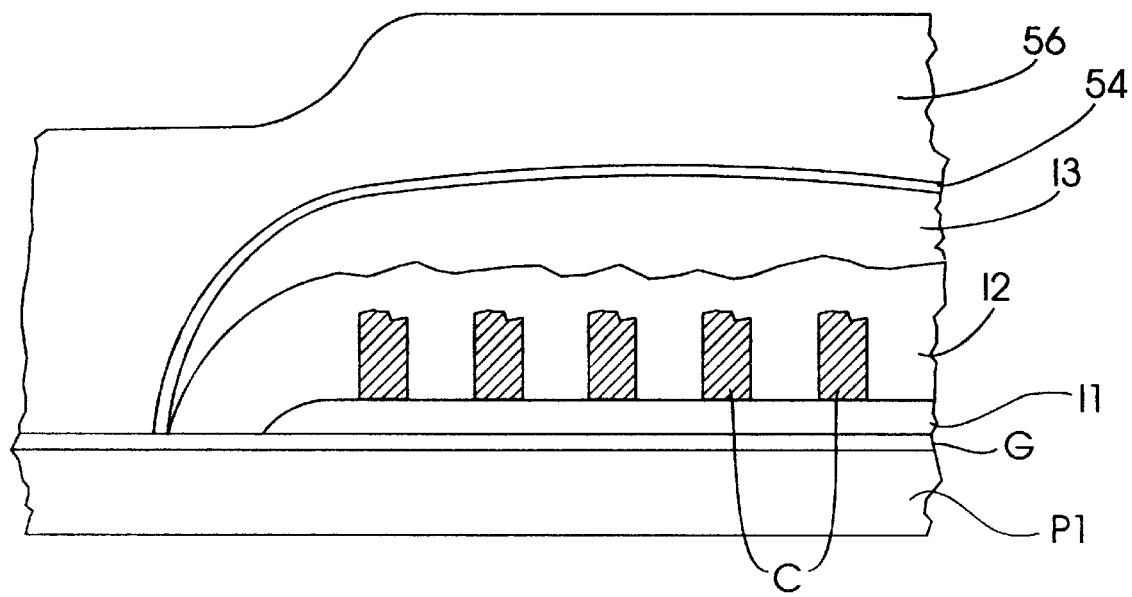
Figure 3J:
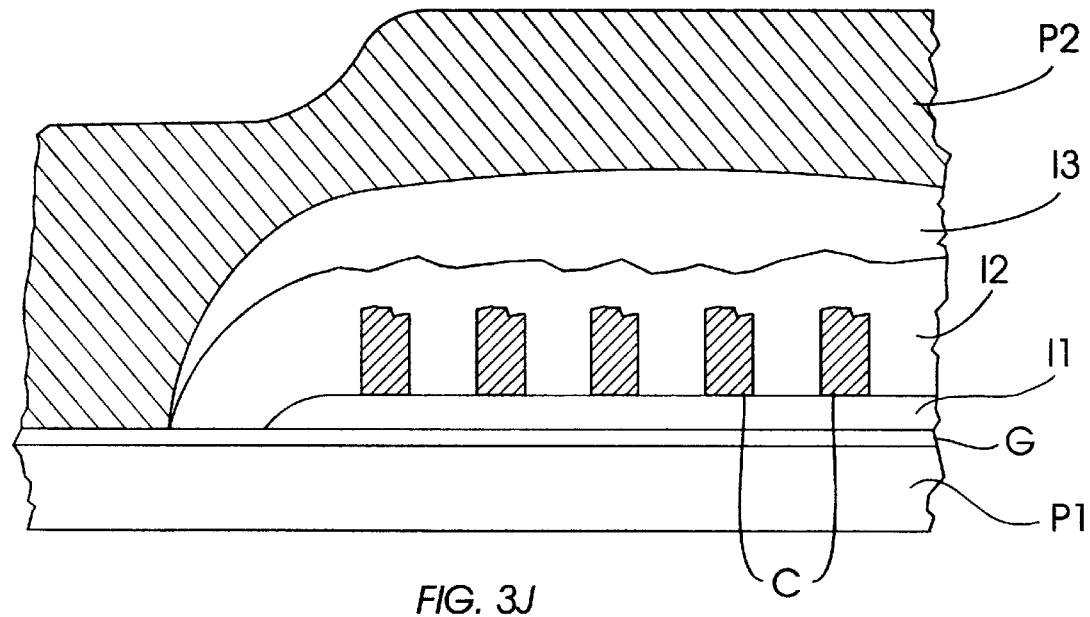

As shown in FIG. 3A, an alumina ($Al_2O_3$) layer is deposited as the write head gap G on top of the first pole piece P1 of the write head. This first pole piece can also be shared with the MR read head as the second shield S2, as shown in the prior art of FIG. 2. Next, a first insulation layer I1 of organic photoresist material is then deposited on top of the write gap G and lithographically patterned, as shown in FIG. 3B. Alternatively, I1 can be made of alumina. A conductive plating seed layer 50, which is preferably formed of NiFe or a bilayer of Cr/Cu, is then deposited over layer I1, as shown in FIG. 3C. Next, photoresist is spun on the seed layer 50 and lithographically patterned to form layer 52 for forming the coil, as shown in FIG. 3D. Copper is then plated into the pattern of layer 52, as shown in FIG. 3E. The photoresist layer 52 is then removed by a resist stripper and the seed layer 50 is removed by sputter etching or ion milling to leave the copper coil C formed directly on layer I1. The resulting structure is shown in FIG. 3F. A second insulation layer I2 is then deposited to encapsulate the coil C and to also define the zero throat and the apex angle, which are both important for optimizing the performance of the write head, as shown in FIG. 3G. A third insulation layer I3 is then deposited over layer I2 and lithographically patterned. The third insulation layer I3 planarizes the topology on top of I2, which is not smooth due to the presence of the coil turns beneath I2. The planarization of I2 is required so that the subsequently deposited ferromagnetic layer that becomes the second pole piece P2 is formed on a planar surface. The structure after the deposition of the I3 layer is shown in FIG. 3H. Each of the insulation layers I1, I2, I3, is preferably formed of the same material, which is an organic photoresist, preferably a novolac-based polymer. After each of the layers I1, I2, I3, is deposited the structure is baked at a high temperature (approximately 240 deg C.) for approximately 2 hours to crosslink the polymer material so that the photoresist material acts as an insulator and is not attacked by photoresist stripper. Next, as shown in FIG. 3I, a conductive plating seed layer 54, for example a layer of NiFe, is then deposited and a photoresist layer 56 onto seed layer 54. Layer 56 is lithographically patterned in the shape of second pole piece P2, The second pole piece P2 is then plated into the pattern defined by the photoresist layer 56. The structure after removal of photoresist layer 56 and seed layer 54 is shown in FIG. 3J. After the fabrication of copper leads and studs for coil interconnection are built. The write head at this point in the fabrication can also be depicted by FIG. 1, since FIG. 1 does not show the alumina overcoat. Also, even though the coil turns C are shown in FIG. 1 they are actually encapsulated under the layers I2 and I3.

At this point in the present invention a dry etch step is applied to remove the I3 and I2 layers from the top and between the coil turns C and in the region outside the pole piece P2 near the ABS, without removing layers I3 and I2 beneath the pole piece P2 and without removing layer I1 beneath the coils C. The result of this etch process will be described below but is shown in the perspective view of FIG. 4. The etching processes use the second pole piece P2 and the plated Cu of coils C as the mask to remove the organic insulation material of layers I3 and I2. This process will first remove all the organic insulation material on top of and between the coil turns C, but will not remove the organic insulation material under the coils C or under the second pole piece P2. As a result, the insulation material with the apex angle defined in the I2 deposition step (FIG. 3G) is preserved. This etching process further proceeds until all the organic insulation material I2 and I1 between the coil turns are also removed.

This dry etching utilizes the selectivity and anisotropy of a dry etching process to remove the organic insulation material where desired without removing where it is needed. The dry etching process is reactive ion etching (RIE) with oxygen as one the gaseous species in the etching plasma. The oxygen ions and neutrals can etch the organic insulation material at a fast rate. Although the active oxygen species in the plasma also oxidizes the metals that are exposed to the plasma, the oxidation rate is much slower than the organic material removal rate, thus a high organic-to-metal selectivity is achieved. Since the oxygen plasma does not etch the alumina gap G on top of the first pole piece P1, the etching process is stopped once the I2 and I1 material between the coil turns is removed.

Because Cu in the coils C and NiFe in the second pole piece P2 are exposed to the plasma since they act as the mask for etching the organic insulation material, the bombardment energy of the etching process needs to be low so the Cu and NiFe are not be sputtered off by the ions in the plasma. The sputtered Cu and NiFe, if landed on the organic insulation to be etched, would produce an undesired micro-masking and severe etching residue would be produced. This etching residue may cause contamination, impede the subsequent alumina overcoat deposition process, and impact the head reliability. Thus, to minimize this sputtering of Cu and NiFe, the bombardment energy of the RIE process is kept below 150 V.

In a conventional RIE tool, the RF power that generates plasma and the reactive species also controls the bombardment energy. To reduce the bombardment energy below 150 V would also reduce the plasma density and slow down the etch rate. For this particular application, since the total insulation thickness (the thickness of I1+I2+I3) can be over 10 microns, a slow etching process would not be acceptable because of low throughput. Thus, in the present invention a high density plasma tool with two power supplies to independently control plasma density and ion bombardment energy is used. The high density plasma etcher is preferably an inductive-coupled-plasma (ICP) etcher or an electron-cyclotron-resonance (ECR) etcher. The plasma density should be above $10^{11}$ ions/cm$^3$. Etch rate of over 1 micron/min at a bombardment energy less than 150 V is easily achieved. This is in contrast with the conventional RIE tool or an asher where the etch rate at this bombardment level can be as slow as 1000 Å/min.

Organic material etching by oxygen plasma is an ion enhanced process, i.e., the etching in the vertical direction is faster than in the lateral direction because of the effect of ion bombardment. However, the lateral etching is still present. In the present invention, the lateral etching, which can occur under the second pole piece P2 and under the coil C, should be minimized to assure the integrity of the head structure. To reduce the lateral etching and still maintain the vertical etch rate, the process pressure should be in the range of 0.5 to 10 mtorr. To further reduce the resist lateral etching, an $O_2/N_2$ mixture, instead of pure $O_2$, is used. The mixture is preferably in the range of 50–90 percent $N_2$.

Figure 4:
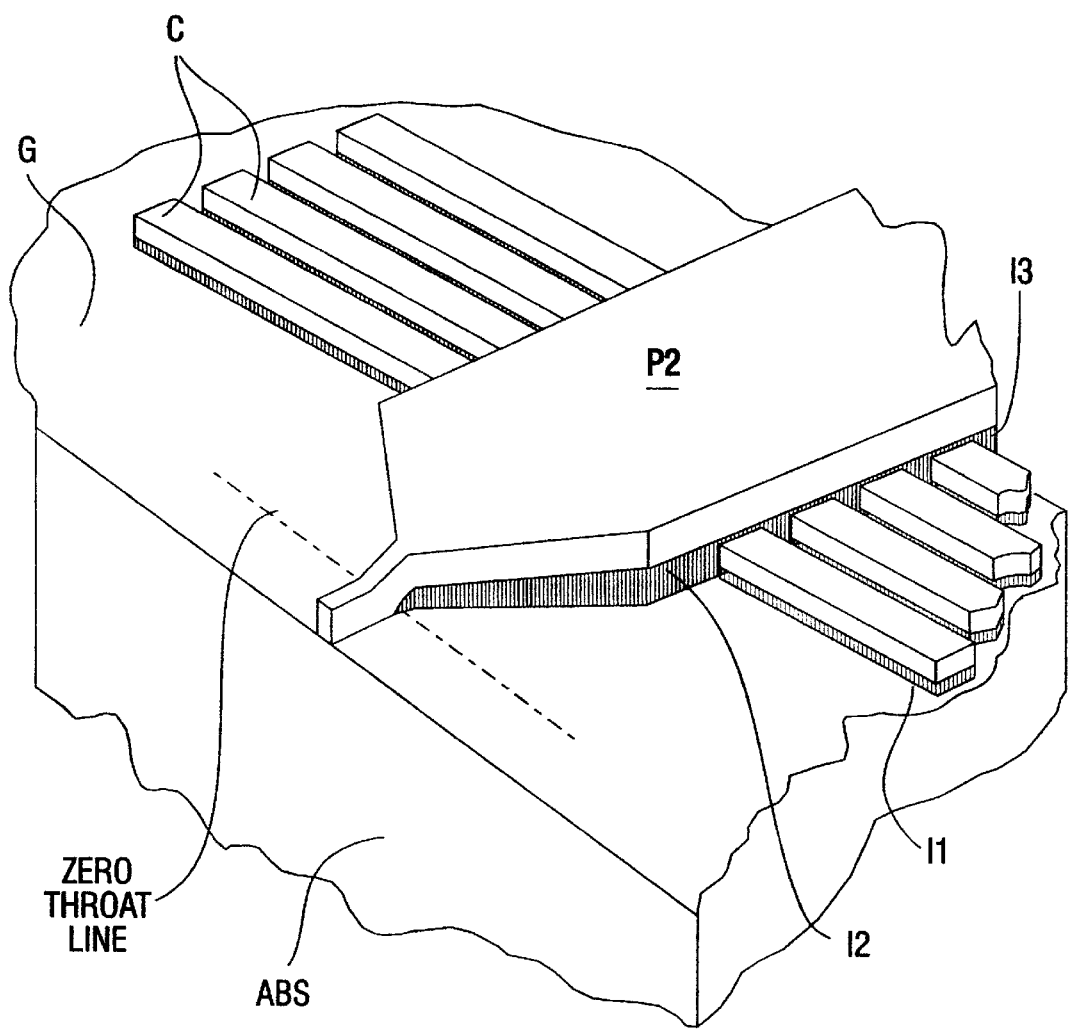
FIG. 4 is a perspective view of the inductive write head of the present invention after completion of the reaction ion etching step to remove organic insulation material between the coil turns and in the region between the ABS and the coil but before deposition of the alumina overcoat.

In an example, a 5 inch ICP etcher was used in the making of the integrated read/write head with minimal organic insulation material. The inductive power was 500 W, corresponding to a plasma density of about $5\times10^{11}$ ions/cm$^3$, and the bias power was 150 W, corresponding to about 100 V of bombardment energy. The pressure was 2 mtorr, and the gas mixture was 40 sccm of $N_2$/10 sccm of $O_2$. An etch rate of 1.1 micron/min was achieved, and the etching was essentially directional with no later etching. This process was applied successfully to make the structure as shown in FIG. 4. In FIG. 4, the organic insulation material has been removed between the coil turns in the portion of the coil that does not lie beneath pole piece P2 as well as in the region around the pole tip between the ABS and the coil. In these regions the alumina overcoat will then be deposited directly on the gap layer G. The coil is still supported on the first layer of organic insulation material I1 and the pole piece P2 has insulation layers I2 and I3 between it and the gap layer G. Thus the resulting head structure will have alumina between the coil turns and on the gap layer G between the ABS and the coil, as well as alumina as the encapsulating overcoat. This will minimize any thermal mismatch of the materials and substantially prevent delamination of the overcoat and/or protrusion of the overcoat past the ABS when heat is generated by the coil during operation of the head.

Figure 5:
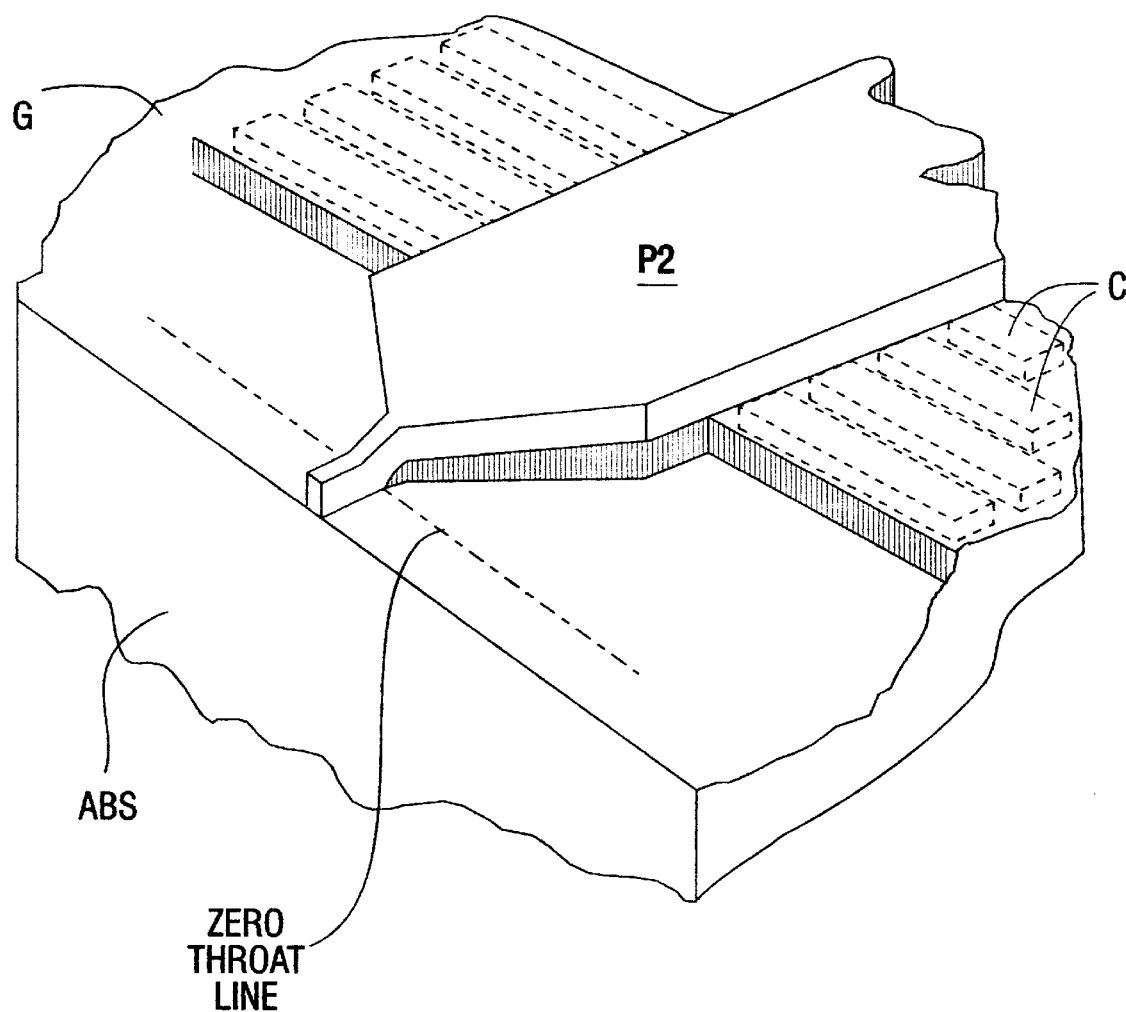
FIG. 5 is a perspective view of an alternative inductive write head made according to an alternative process after completion of the reaction ion etching step to remove organic insulation material in just the region between the ABS and the coil but before deposition of the alumina overcoat.

After structure as shown in FIG. 4 is made, the alumina overcoat is then deposited to encapsulate the head structure. While alumina is the preferred material for the overcoat, other dielectric materials that may be used include $SiO_2$ and SiN. A sputter etch process is used to clean the wafer before deposition of the alumina. However, the amount of sputter etching should be minimized to reduce the risk of shorting the Cu coil due to the sputtering of the exposed Cu. One alternative to circumvent this problem is to apply a resist mask to cover the coil at least in the region not beneath P2 before the RIE dry etching process. Using this alternative process, the organic insulation material near the zero throat region and the region between the ABS and the coil turns nearest the ABS is removed by the RIE but the organic insulation material above and between the coil turns is left intact, as shown in FIG. 5. Compared to FIG. 4, the structure in FIG. 5 has more organic insulation but the coils are better protected during the subsequent process. The advantage of the present invention is still achieved because a substantial portion of organic material onto which the alumina overcoat would otherwise be deposited is not present to cause cracking or delamination of the overcoat or protrusion of the overcoat at the ABS when heat is generated by the coil during operation of the head.

Figure 6A:
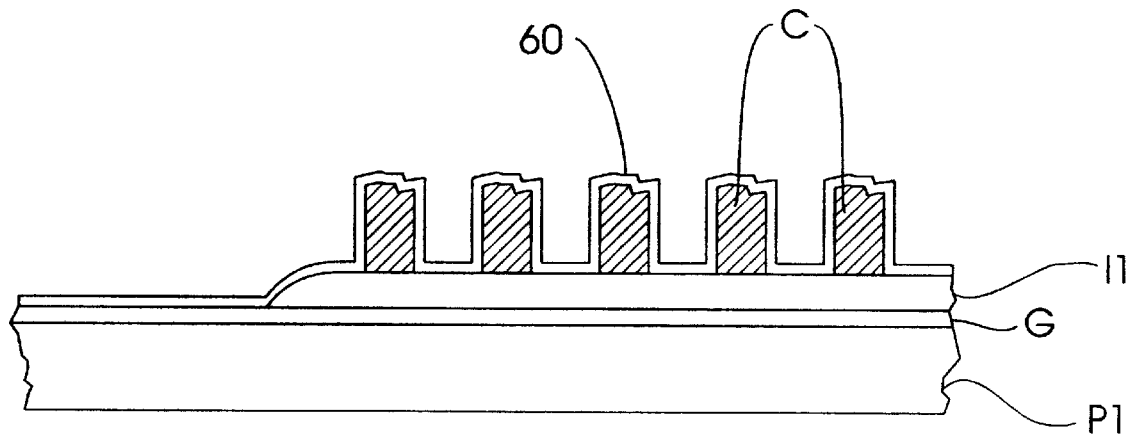
FIGS. 6A–6B are sectional views of the inductive write head illustrating an alternative to the process to protect the sidewalls of the coil turns during the reactive ion etching step.
Figure 6B:
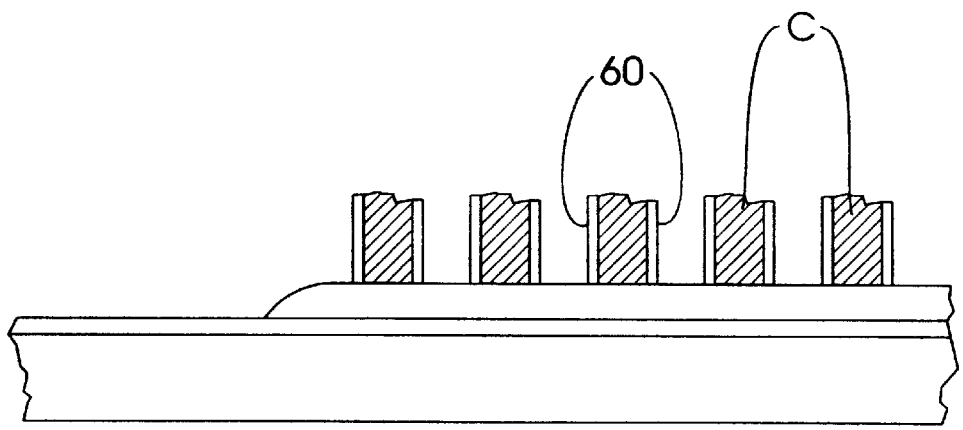

For very narrow Cu coil turns, the oxidation of the Cu coil sidewalls during the RIE dry etching step may become unacceptable. One alternative is to deposit a thin layer (50–200 Å) of oxidation protection material, such as Ta, Cr, $SiO_2$ or $Al_2O_3$, conformably over the coil by a vacuum deposition technique right after the fabrication of the Cu. This is shown as layer 60 in FIG. 6A. Then an anisotropic dry etching process such as ion milling or RIE is applied to remove layer 60 from the top of the coil turns C and the horizontal surfaces between the coil turns but leave the material from layer 60 on the coil sidewalls intact to produce a structure as shown in FIG. 6B. The sidewall material will then protect the Cu coil from oxidation during the subsequent RIE etching of the organic insulation material.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for making a thin film inductive write head having first and second pole pieces with pole tips spaced by a nonmagnetic gap and a layer of electrically conductive material patterned as a coil between the first and second pole pieces, the method comprising:

providing a layer of ferromagnetic material to serve as the first pole piece;

depositing a layer of nonmagnetic gap material on the first pole piece layer;

depositing a first layer of organic insulation material over the gap layer;

patterning an electrically conductive layer into a coil on the first insulation layer;

depositing a planarizing layer of organic insulation material over the coil onto the first layer of insulation material in the regions between the turns of the coil and onto the gap layer in the region near the pole tip of the first pole piece layer;

patterning a layer of ferromagnetic material over the planarizing layer of organic insulation material to pattern the second pole piece over a portion of the coil;

applying a pattern of photoresist material over at least the portion of the coil not beneath the second pole piece;

reactive ion etching the insulation layers down to the gap layer using the second pole piece and the pattern of photoresist material as a mask; whereby organic insulation material is substantially removed in the region near the pole tip of the second pole piece; and depositing a layer of dielectric material over the second pole piece and onto the gap layer exposed by the reactive ion etching; whereby the dielectric material is located on the gap layer in the region near the pole tip of the second pole piece and over the second pole piece and organic insulation material is located beneath the second pole piece layer, beneath the coil, and on top of and between the coil turns.

2. The method of claim 1 wherein reactive ion etching comprises reactive ion etching with a mixture of oxygen and nitrogen.

3. The method of claim 1 wherein reactive ion etching the insulation material comprises independently controlling the plasma density and the ion bombardment energy.

4. The method of claim 1 wherein reactive ion etching the insulation material comprises reactive ion etching using an inductive-coupled-plasma etcher.

5. The method of claim 1 wherein depositing the planarizing layer of organic insulation material comprises depositing a second layer of organic insulation material and depositing a third layer of organic insulation material over the second layer of organic insulation material.

6. The method of claim 1 wherein depositing the dielectric material comprises depositing alumina.

7. The method of claim 1 wherein depositing the layers of organic insulation material comprises depositing a novolac-based polymer and heating to crosslink the polymer.

8. A method for making a thin film inductive write head having first and second pole pieces with pole tips spaced by a nonmagnetic gap and a layer of electrically conductive material patterned as a coil between the first and second pole pieces, the method comprising:

providing a layer of ferromagnetic material to serve as the first pole piece;

depositing a layer of nonmagnetic gap material on the first pole piece layer;

depositing a first layer of organic insulation material over the gap layer;

patterning an electrically conductive layer into a coil on the first insulation layer;

depositing a planarizing layer of organic insulation material over the coil onto the first layer of insulation material in the regions between the turns of the coil and onto the gap layer in the region near the pole tip of the first pole piece layer;

patterning a layer of ferromagnetic material over the planarizing layer of organic insulation material to pattern the second pole piece over a portion of the coil;

reactive ion etching the insulation layers down to the gap layer using as a mask the second pole piece and the coil; whereby organic insulation material is substantially removed between the turns of the coil and in the region near the pole tips; and depositing a layer of dielectric material over the second pole piece and the coil and onto the gap layer exposed by the reactive ion etching; whereby the dielectric material is located between the turns of the coil and on top of the coil.

9. The method of claim 8 wherein reactive ion etching comprises reactive ion etching with a mixture of oxygen and nitrogen.

10. The method of claim 8 wherein reactive ion etching the insulation material comprises independently controlling the plasma density and the ion bombardment energy.

11. The method of claim 8 wherein reactive ion etching the insulation material comprises reactive ion etching using an inductive-coupled-plasma etcher.

12. The method of claim 8 wherein depositing the planarizing layer of organic insulation material comprises depositing a second layer of organic insulation material and depositing a third layer of organic insulation material over the second layer of organic insulation material.

13. The method of claim 8 wherein depositing the dielectric material comprises depositing alumina.

14. The method of claim 8 wherein depositing the layers of organic insulation material comprises depositing a novolac-based polymer and heating to crosslink the polymer.

15. The method of claim 8 wherein the turns of the coil have sidewalls substantially perpendicular to the first insulation layer on which they are formed and further comprising forming a layer of oxidation protection material onto the sidewalls of the coil turns before deposition of the second layer of organic insulation material.

16. The method of claim 15 wherein forming a layer of oxidation protection material comprises forming a layer of material selected from the group consisting of Ta, Cr, $SiO_2$ and $Al_2O_3$.

17. A thin film inductive write head formed on a substrate comprising:

a first pole piece of ferromagnetic material formed on the substrate;

a layer of nonmagnetic gap material formed on the first pole piece;

an electrically conductive coil patterned into a plurality of coil turns with sidewalls, the coil being located on organic insulation material formed on the first pole piece;

a second pole piece of ferromagnetic material located over a first portion of the coil, the second pole piece having a pole tip in contact with the gap layer, the region between the first and second pole pieces and between the sidewalls of the coil turns in said first portion of the coil being substantially filled with organic insulation material; and a layer of dielectric material formed over the second pole piece and over the portion of the coil not beneath the second pole piece, the dielectric material being located directly on the gap layer in the region between the pole tip of the second pole piece and the portion of the coil not beneath the second pole piece.

18. The head of claim 17 wherein the dielectric material is also located on the gap layer between the sidewalls of the coil turns in the portion of the coil not beneath the second pole piece.

* * * * *